(12) United States Patent
Park

(10) Patent No.: US 12,063,061 B1
(45) Date of Patent: Aug. 13, 2024

(54) MOBILE PHONE ACCESSORY CAPABLE OF FREELY GRIPPING AND MOUNTING MOBILE PHONE USING MAGNETIC BAND

(71) Applicant: Jong Seop Park, Yongin-si (KR)

(72) Inventor: Jong Seop Park, Yongin-si (KR)

( * ) Notice: Subject to any disclaimer, the term of this patent is extended or adjusted under 35 U.S.C. 154(b) by 0 days.

(21) Appl. No.: 18/579,822

(22) PCT Filed: Apr. 8, 2022

(86) PCT No.: PCT/KR2022/095082
§ 371 (c)(1),
(2) Date: Jan. 16, 2024

(87) PCT Pub. No.: WO2023/287268
PCT Pub. Date: Jan. 19, 2023

(30) Foreign Application Priority Data

Jul. 13, 2021 (KR) .......................... 10-2021-0091452

(51) Int. Cl.
*H04B 1/3888* (2015.01)
(52) U.S. Cl.
CPC .................................. *H04B 1/3888* (2013.01)
(58) Field of Classification Search
CPC .... H04B 1/3888; H04M 1/0279; H04M 1/04; F16M 13/00; F16M 11/041; F16M 13/022; A45C 13/10; A45C 13/30; A45C 2013/1015; Y10T 24/32; Y10T 24/39; Y10T 24/3987; G06F 1/1626; G06F 1/1628; G06F 1/163
See application file for complete search history.

(56) References Cited

U.S. PATENT DOCUMENTS

| | | | |
|---|---|---|---|
| 2013/0114232 A1* | 5/2013 | Tsai | G06F 1/1626 361/807 |
| 2018/0324288 A1* | 11/2018 | Rothbaum | H04B 1/3888 |
| 2019/0104812 A1* | 4/2019 | Trahern | A45C 11/00 |

(Continued)

FOREIGN PATENT DOCUMENTS

| KR | 101364700 B1 | 2/2014 |
|---|---|---|
| KR | 101390427 B1 | 4/2014 |
| KR | 101597196 B1 | 2/2016 |

(Continued)

OTHER PUBLICATIONS

KR Office Action dated May 16, 2022 as received in Application No. 10-2021-0091452.

(Continued)

*Primary Examiner* — Quoc Thai N Vu
(74) *Attorney, Agent, or Firm* — Maschoff Brennan

(57) ABSTRACT

A mobile phone accessory that allows a user to hold and mount a cell phone freely using a magnetic band is provided. The mobile phone accessory according to an embodiment of the present invention includes a magnet band with magnets on opposite sides thereof and a metal plate positioned on a backside of a mobile phone or a mobile phone case, and to which the magnet provided on the magnet band is attached. Thereby, by using the magnetic band, the mobile phone can be used while freely changing a position and a direction of the mobile phone on the palm. And the mobile phone can be used by being placed on the floor in various directions and at various angles.

6 Claims, 4 Drawing Sheets

(56) References Cited

U.S. PATENT DOCUMENTS

2021/0153635 A1* 5/2021 Vasquez ................. H04B 1/385

FOREIGN PATENT DOCUMENTS

| KR | 10-1705820 B1 | 2/2017 |
| KR | 101705820 B1 | 2/2017 |
| KR | 20-0490903 Y1 | 1/2020 |
| KR | 200490903 Y1 | 1/2020 |
| KR | 20-2020-0002248 U | 10/2020 |
| KR | 2020200002248 | 10/2020 |

OTHER PUBLICATIONS

KR Office Action dated Nov. 11, 2022 as received in Application No. 10-2021-0091452.
KR Decision to Grant Dated Sep. 21, 2023 as received in Application No. 10-2021-0091452.
Korean Office Action dated Nov. 11, 2022 as received in application No. 1020210091452.
Korean Office Action dated May 12, 2023 as received in application No. 1020210091452.
Notice of Decision to Grant dated Sep. 21, 2023 as received in Korean application No. 1020210091452.

* cited by examiner

MOBILE PHONE ACCESSORY CAPABLE OF FREELY GRIPPING AND MOUNTING MOBILE PHONE USING MAGNETIC BAND

TECHNOLOGY FIELD

The present invention relates to a mobile phone accessory, and more in detail, to a mobile phone accessory that allows a mobile phone to be comfortably and freely held or mounted.

BACKGROUND ART

FIG. 1 is a diagram illustrating a conventional mobile phone ring. As shown, the conventional mobile phone ring 20 is an accessory attached to the backside of the mobile phone case 10 with double-sided tape and used by hanging a finger.

When a finger is inserted into the cell phone ring 20, the cell phone does not come off from the palm even if you do not hold the cell phone tightly with your hand. Accordingly, it is particularly useful when holding and using a mobile phone for a long time.

However, since the position of the conventional mobile phone ring is fixed, the holding position of the mobile phone is inevitably limited. That means it is difficult to use the mobile phone while changing the position of the mobile phone frequently because it is difficult to change the position of the mobile phone ring attached to the backside of the mobile phone easily.

DISCLOSURE

Technical Problem

The present invention has been conceived to solve the problem as mentioned above. The purpose of the present invention is to provide a mobile phone accessory that allows a user to hold the mobile phone using a magnet band, as a method for freely changing the position and the direction of the mobile phone on a palm.

In addition, another purpose of the present invention is to provide a mobile phone accessory that allows a user to hold a mobile phone using a magnet band, as a method for mounting the mobile phone on the floor in various directions and at various angles.

Technical Solution

To achieving the object, a mobile phone accessory according to an embodiment the present invention including: a magnet band with magnets on opposite sides thereof; and a metal plate positioned on a backside of a mobile phone or mobile phone case, and to which a magnet provided on the magnet band is attached.

The magnetic band including: a band made having flexible material; a first magnet fixed to one end of the band; a second magnet fixed to another end of the band; a first holder provided at one end of the band and in which the first magnet is stored and fixed; a second holder provided at another end of the band and in which the second magnet is stored and fixed.

Positions at which the first magnet and the second magnet are attached to the metal plate are selected and adjusted by a user.

The band of the magnetic band is bent to form a space between the band and the metal plate, and at least one of a user's fingers holding a mobile phone is inserted into the formed space.

By adjusting the positions of the first magnet and second magnet, the position and direction in which the space is formed may be adjusted.

The band of the magnet band is bent, and the central portion of the band protrudes from the metal plate, and the mobile phone may is inclined and mounted from the ground surface by the protruding band.

By adjusting the positions of the first magnet and the second magnet, the direction and angle in which the mobile phone is placed may be adjusted.

When the magnet band is not utilized, the positions of the first magnet and second magnet may be adjusted to positions that flatten the band of the magnet band.

The flexible material may be any one of rubber, silicone, and leather. The metal plate can be attached to the backside of the mobile phone case with double-sided tape. In the metal plate, an outer line may protrude. The metal plate may be coated with total surface reflection to function as a mirror.

On the other hand, a mobile phone accessory according to another embodiment of the present invention includes: a band; a first magnet fixed to one end of the band and attached to a metal plate positioned on a backside of a mobile phone or a mobile phone case; and a second magnet fixed to another end of the band and attached to the metal plate positioned on a backside of the mobile phone or the mobile phone case.

Advantageous Effects

As described above, according to embodiments the present invention, a mobile phone may be used while freely changing the position and the direction of the mobile phone on the palm by using a magnet band, and the mobile phone can be used by placing it on the floor in various directions and at various angles.

DETAILS TO IMPLEMENT THE INVENTION

Hereinafter, the present invention will be described in more detail with reference to the drawings.

Figure 1:
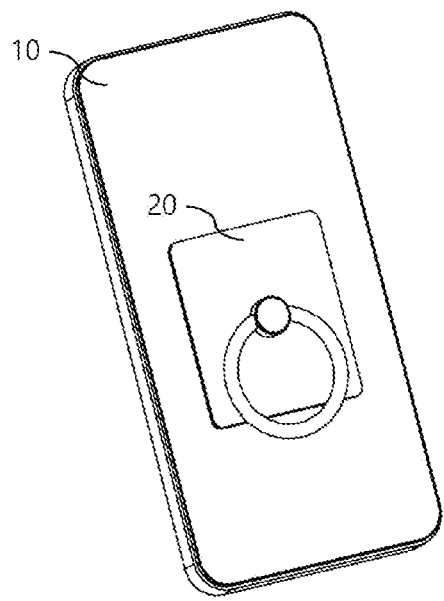
FIG. 1 is a drawing illustrating a conventional mobile phone ring.
Figure 2:
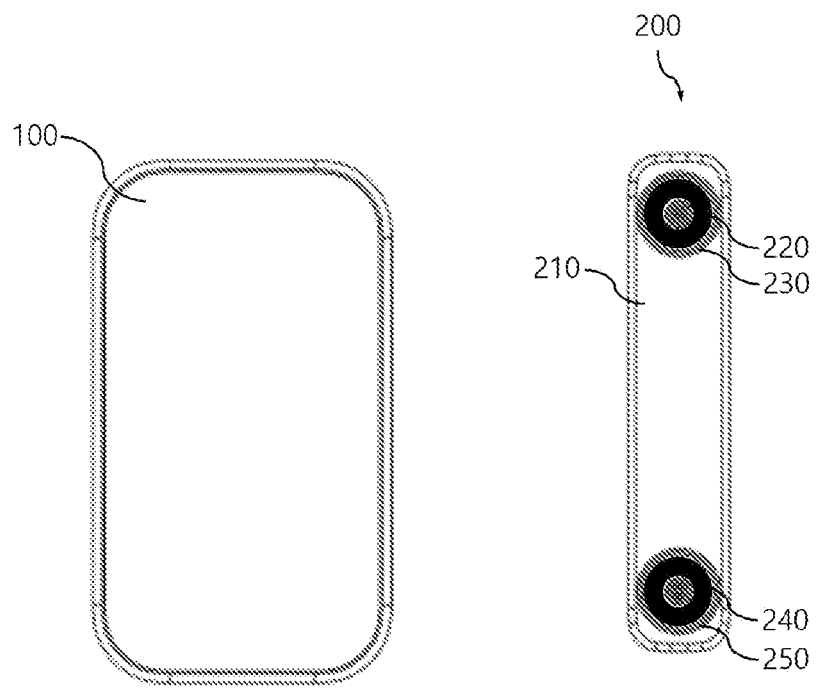
FIG. 2 is a drawing provided in a description of a mobile phone accessory according to an embodiment of the present invention.

FIG. 2 is a drawing provided in a description of a mobile phone accessory according to an embodiment of the present invention. The mobile phone accessory according to an embodiment of the present invention includes a metal plate 100 and a magnet band 200 as shown in FIG. 2.

The metal plate 100 is used by being attached to the backside of the mobile phone case (not shown). The metal plate 100 may be attached to the back surface of the mobile phone case with double-sided tape. It may be used by attaching it to the backside of a mobile phone (not shown) instead of a mobile phone case.

Figure 3:
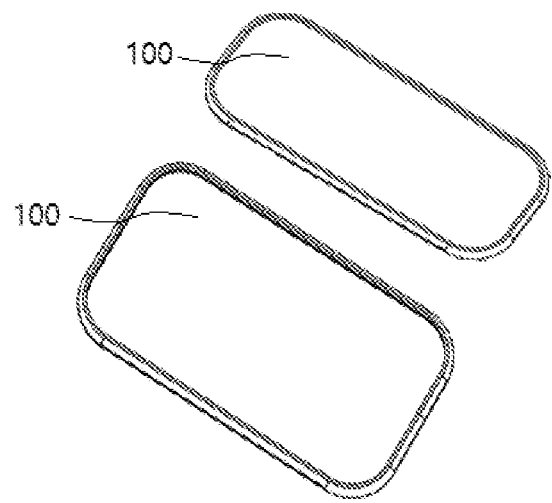
FIG. 3 is a drawing illustrating various examples of a metal plate.

The metal plate 100 may be embodied in various standards. FIG. 3 illustrates two metal plates 100 having different widths as examples.

Meanwhile, as shown in FIG. 3, the metal plate 100 may be embodied such that an outer line protrudes. As explained later, in the metal plate 100, the magnet band 200 is attached to various positions by the user, and the attached position may be adjusted (changed) by the user. If the outer line of the metal plate 100 protrudes, the attachment position of the magnet band 200 may be limited to the inner region of the metal plate 100. That is, by the protruding outer line of the metal plate 100, the magnet band 200 does not come out to the outer side of the metal plate 100.

In addition, the surface of the metal plate 100 may be coated with total reflection, and in this case, the metal plate 100 can function as a mirror.

The magnet band 200 is a component used by being attached to the metal plate 100, and includes a band 210, a first magnet 220, a first magnet holder 230, a second magnet 240, and a second magnet holder 250 as shown in FIG. 2.

The band 210 is made of a flexible material that can be easily bent, such as rubber, silicone, and leather.

The first magnet 220 is a magnet fixed to one end of the band 210, and the second magnet 240 is a magnet fixed to another end of the band 210. The magnet band 200 is attached to the metal plate 100 by the first magnet 220 and the second magnet 240.

The first magnet holder 230 is configured to fix the first magnet 220 to one end of the band 210 and includes a space for storing and a means for fixing the first magnet 220.

The second magnet holder 250 is configured to fix the second magnet 240 to another end of the band 210 and includes a space for storing and a means for fixing the second magnet 240.

Figure 4:
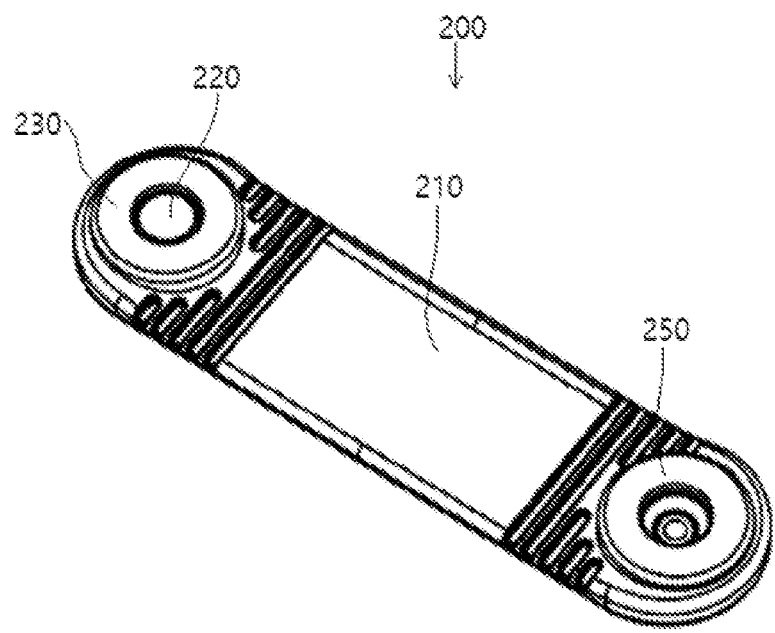
FIG. 4 is a perspective view of a magnet band showing structures of magnet holders in detail.

FIG. 4 is a perspective view of the magnet band 200. In FIG. 4, the first magnet 220 is coupled to the first magnet holder 230, but the second magnet 240 is not coupled to the second magnet holder 250 so as to check the internal structure of the magnet holder.

Figure 5:
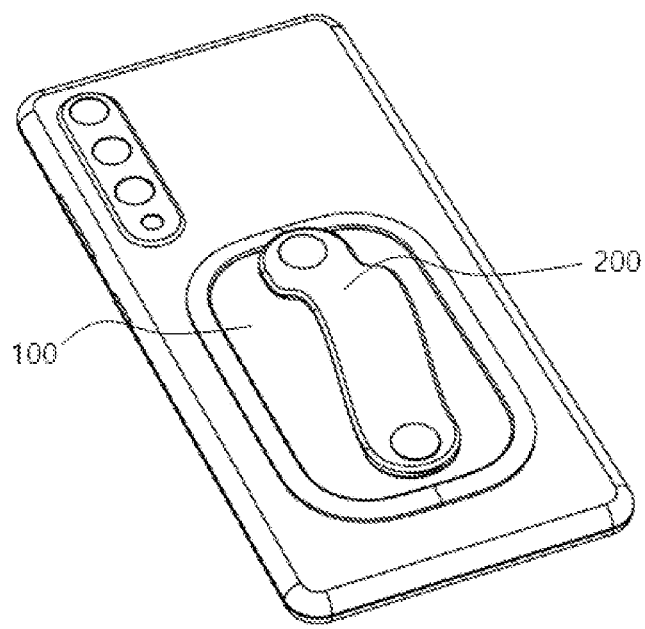
FIGS. 5 and 6 are drawings illustrating a state in which the metal plate is attached to the backside of the mobile phone and the magnet band is attached to the metal plate.
Figure 6:
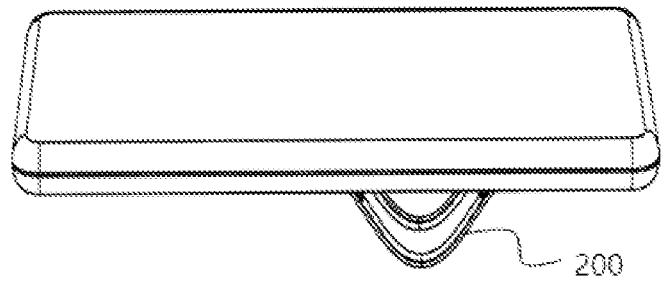

FIGS. 5 and 6 shows a state which the metal plate 100 is attached to the back of the mobile phone, and the magnet band 200 is attached to the metal plate 100.

When the distance between the first magnet 220 and the second magnet 240 is selected/adjusted to be shorter than the length of the band 210, as shown in FIGS. 5 and 6, the band 210 of the magnet band 200 is bent to form a space between the magnet band 200 and the metal plate 100. In the formed space, one of the user's fingers (typically an index finger or middle finger) holding the mobile phone is inserted and used.

If the length of the band 210 is long enough, two fingers of the user may be inserted and used.

Meanwhile, positions at which the first magnet 220 and the second magnet 240 are attached to the metal plate 100 may be freely selected by the user. Furthermore, even once attached to the metal plate 100, the positions of the first magnet 220 and the second magnet 240 may be adjusted/changed by the user.

By the position selection/adjustment of the first magnet 220 and the second magnet 240, the band 210 is bent so that the position and the direction of the space formed between the band 210 and the metal plate 100 may be freely adjusted. Accordingly, the position and the direction of the mobile phone in the user's hand may be freely adjusted.

On the other hand, when the band 210 is bent, the central portion of the band 210 protrudes from the metal plate 100, which can be observed in FIGS. 5 and 6. The mobile phone may be placed obliquely on the ground by the protruding band 210.

Figure 7:
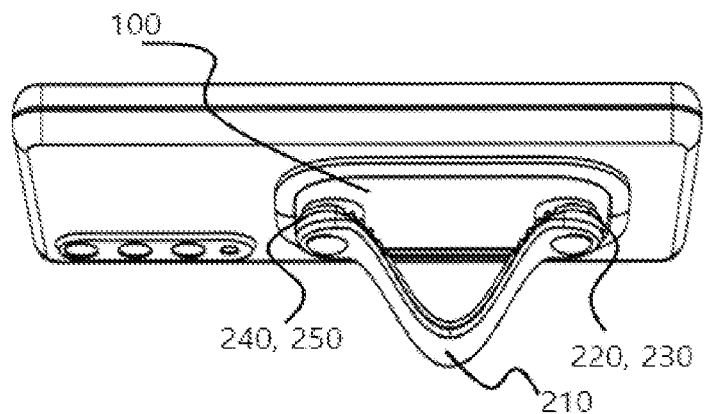
FIG. 7 is a drawing illustrating a state in which the mobile phone is obliquely placed on the ground using the magnet band.

FIG. 7 is a drawing illustrating a state in which the mobile phone is obliquely placed on the ground using the band 210, from the backside of the mobile phone.

Even when the mobile phone is placed from the ground using the band 210, if the positions of the first magnet 220 and the second magnet 240 are selected/adjusted, it may adjust the angle at which the mobile phone is placed, that is to say the angle formed by the backside of the mobile phone with the ground.

Furthermore, by selecting/adjusting the positions of the first magnet 220 and the second magnet 240, the direction in which the mobile phone is placed (longitudinal direction or width direction) may be adjusted.

Figure 8:
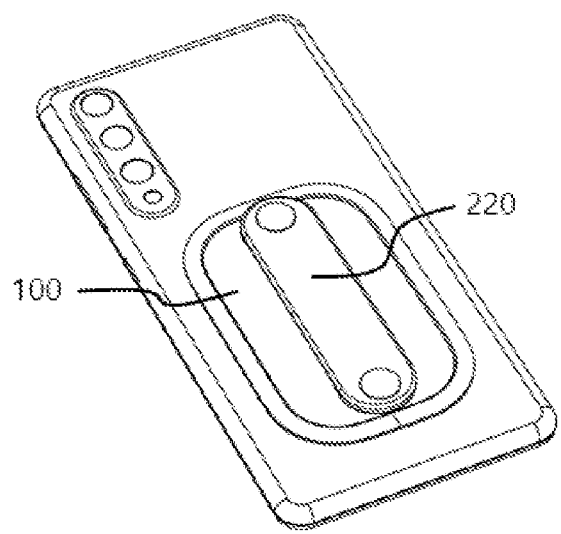
FIG. 8 is a drawing illustrating a state in which the mobile phone is not held or placed using the magnet band.

FIG. 8 is a drawing illustrating a state in which the mobile phone is not held or placed using the band 210, from the backside of the mobile phone. As shown in FIG. 8, when the magnet band 200 is not used, the positions of the first magnet 220 and the second magnet 240 are adjusted to positions that flatten the band 210, and specifically, the distance between the first magnet 220 and the second magnet 240 is widened to flatten the band 210.

Until now, a mobile phone accessory that allows a user to freely holding and placing a mobile phone using a magnetic band has been described in detail with reference to a preferred embodiments.

On the other hand, it should be noted that even if only the magnet band is implemented, or only the metal plate attached to the magnet band is implemented, it may be included in the scope of the present invention.

In addition, although the preferred embodiments of the present invention have been illustrated and described above, the present invention is not limited to the specific embodiments as explained above. Without departing from the gist of this invention, which is claimed within the scope of the claim, various modifications can be implemented by those of ordinary skill in the technical field to which the present invention pertains, and these modifications should not be individually understood from the technical spirit or prospect of the present invention.

EXPLANATION OF THE CODE

100: Metal plate
200: Magnet band
210: Band
220, 240: Magnets
230, 250: Magnet Holders

The invention claimed is:

1. A mobile phone accessory comprising:
a magnet band fixing each of a first magnet and a second magnet on opposite sends thereof; and
a metal plate positioned on a backside of a mobile phone or a mobile phone case, and having a certain size for slipping and freely moving and rotating in every direction with the first magnet and the second magnet attached on opposite ends of the magnet band, wherein after being attached to the metal plate, the first magnet and the second magnet slides with the first magnet and the second magnet attached, the positions of the first magnet and the second magnet is freely and frequently adjusted by user having fingers fitted into the magnet band, and the positions of the first magnet and the second magnet are adjusted without a restriction of a direction, wherein the positions of the first magnet and the second magnet is adjusted in different directions, and adjusting directions of the first magnet and the second magnet is not limited, and wherein an outer line of the metal plate protrudes to prevent the first magnet and the second magnet from sliding and moving out of the metal plate.

2. The mobile phone accessory of claim 1, wherein the magnetic band comprising:
   a band made having flexible material;
   a first magnet fixed to one end of the band;
   a second magnet fixed to another end of the band;
   a first holder provided at one end of the band and in which the first magnet is stored and fixed;
   a second holder provided at another end of the band and in which the second magnet is stored and fixed.

3. The mobile phone accessory of claim 2, wherein the band of the magnetic band is bent to form a space between the band and the metal plate, and
   at least one of a user's fingers holding a mobile phone is inserted into the formed space.

4. The mobile phone accessory of claim 2, wherein the band of the magnetic band is bent, and a central portion of the band protrudes from the metal plate, and
   the mobile phone is inclined and mounted from a ground by a protruding band.

5. The mobile phone accessory of claim 2, wherein a material of the band is any one of rubber, silicone, and leather.

6. The mobile phone accessory of claim 1, wherein the metal plate functions as a mirror by being coated with total surface reflection.

* * * * *